United States Patent
Ikeda et al.

(10) Patent No.: US 9,636,937 B2
(45) Date of Patent: May 2, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Tohru Ikeda, Yokohama (JP); Yumi Yanai, Yokohama (JP); Masao Kato, Kawasaki (JP); Manabu Yamazoe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/971,287

(22) Filed: Dec. 16, 2015

(65) Prior Publication Data

US 2016/0167415 A1 Jun. 16, 2016

(30) Foreign Application Priority Data

Dec. 16, 2014 (JP) .................... 2014-254026

(51) Int. Cl.
*B41J 2/21* (2006.01)
*G06K 9/38* (2006.01)
(Continued)

(52) U.S. Cl.
CPC ............. *B41J 29/38* (2013.01); *B41J 2/2132* (2013.01); *G06K 15/102* (2013.01)

(58) Field of Classification Search
CPC ... B41J 2/01; B41J 2/2132; B41J 29/38; B41J 2/2056; B41J 2/2054; G06K 15/107;
(Continued)

(56) References Cited

U.S. PATENT DOCUMENTS 6,738,160 B1 5/2004 Kato
7,099,046 B2 8/2006 Kato
(Continued)

FOREIGN PATENT DOCUMENTS

JP 2006-168180 6/2006
JP 2007-168202 7/2007

OTHER PUBLICATIONS

Robert Ulichney, "The void-and-cluster method for dither array generation", Proceedings SPIE, Human Vision, Visual Processing, Digital Displays IV, vol. 1913, pp. 332-343, 1993.
(Continued)

*Primary Examiner* — Thinh H Nguyen
(74) *Attorney, Agent, or Firm* — Fitzpatrick, Cella, Harper & Scinto

(57) ABSTRACT

An image processing apparatus has a first quantization configured to quantize multi-valued data corresponding to the first ink to generate the first quantized data, the multi-valued data indicating intermediate density; and a second quantization unit configured to quantize multi-valued data corresponding to the second ink to generate the second quantized data, the multi-valued data indicating intermediate density. In a case where a satellite of the first ink is more conspicuous than a satellite of the second ink on the print medium, a first dot pattern printed on the print medium based on the first quantized data has higher dispersibility than a second dot pattern printed on the print medium based on the second quantized data.

25 Claims, 14 Drawing Sheets

(51) Int. Cl.
*B41J 29/38* (2006.01)
*G06K 15/10* (2006.01)

(58) Field of Classification Search
CPC .......... G06K 9/38; G06K 9/46; G06K 15/102; H04N 1/4057
See application file for complete search history.

(56) References Cited

U.S. PATENT DOCUMENTS

| | | |
|---|---|---|
| 7,312,901 B2 | 12/2007 | Yamada |
| 7,548,346 B2 | 6/2009 | Yamada |
| 7,672,011 B2 | 3/2010 | Kato |
| 7,855,809 B2 | 12/2010 | Kato |
| 7,859,723 B2 | 12/2010 | Yamada |
| 7,965,418 B2 | 6/2011 | Yamada |
| 2015/0178599 A1* | 6/2015 | Ushiyama ............ G06K 15/102 358/1.8 |

OTHER PUBLICATIONS

U.S. Appl. No. 14/971,271, filed Dec. 16, 2015.
U.S. Appl. No. 14/971,277, filed Dec. 16, 2015.
U.S. Appl. No. 14/991,618, filed Jan. 8, 2016.

\* cited by examiner

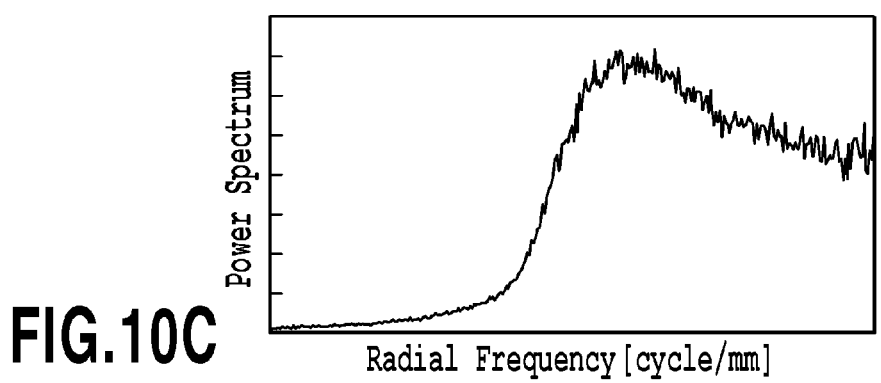
FIG.10A THRESHOLD VALUE MATRIX, 262144 PIXELS (512 X 512)
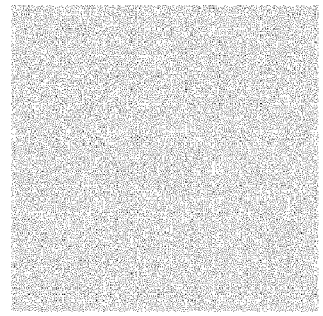
FIG.10B
FIG.10C

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, image processing method and storage medium for printing image data after a quantization process on a print medium using an inkjet print head.

Description of the Related Art

In an inkjet printing apparatus, when each printing element of an inkjet print head ejects ink, a sub-droplet or smaller mist in addition to a main droplet is sometimes ejected. In so doing, the main droplet actually used to form an image can be controlled in placing position on a print medium and in ejection amount, but the sub-droplet or mist is difficult to control in size or amount because occurrence itself is unexpected. Hereinafter, a small dot formed by a sub-droplet or mist placing on a print medium is generally referred to as a satellite in this specification. The satellite is a dot irrelevant to an image, and therefore in many inkjet printing apparatus, recognized as one of factors deteriorating an image.

Patent literatures such as Japanese Patent Laid-Open Nos. 2007-168202 and 2006-168180 disclose a printing method and ejection port arraying configuration for making a satellite, which unexpectedly occurs, as inconspicuous as possible.

SUMMARY OF THE INVENTION

Meanwhile, the occurrence of or the degree of conspicuousness of a satellite varies depending on the type or color of ink. Also, even in the case of ejecting the same ink, the state of a satellite variously changes depending on the use environment of the ink. However, the above patent literatures only disclose a method for making a satellite, which inevitably occurs, as inconspicuous as possible, but do not attempt to suppress the occurrence itself of a satellite in consideration of the mechanism of or the use environment dependence of satellite occurrence. Accordingly, sometimes, depending on an image or ink to be printed, a satellite having occurred is inevitably conspicuous, and a high-quality image cannot be outputted.

The present invention is made in order to solve the above problem. Therefore, an object of the present invention is to provide an image processing apparatus and image processing method that can suppress the occurrence of a satellite for any ink, and stably output a high-quality image.

According to a first aspect of the present invention, there is provided an image processing apparatus for printing an image on a print medium by using a printing unit that ejects a first ink based on first quantized data and ejects a second ink based on second quantized data, the image processing apparatus comprising: a first quantization unit which quantizes multi-valued data corresponding to the first ink to generate the first quantized data, the multi-valued data indicating intermediate density; and a second quantization unit which quantizes multi-valued data corresponding to the second ink to generate the second quantized data, the multi-valued data indicating intermediate density, wherein: a satellite of the first ink is more conspicuous than a satellite of the second ink on the print medium, and a first dot pattern printed on the print medium based on the first quantized data has higher dispersibility than a second dot pattern printed on the print medium based on the second quantized data.

According to a second aspect of the present invention, there is provided image processing method for printing an image on a print medium by ejecting a first ink based on first quantized data and ejecting a second ink based on second quantized data, the image processing method comprising: a first quantization step of quantizing multi-valued data corresponding to the first ink to generate the first quantized data, the multi-valued data indicating intermediate density; and a second quantization step of quantizing multi-valued data corresponding to the second ink to generate the second quantized data, the multi-valued data indicating intermediate density, wherein: a satellite of the first ink is more conspicuous than a satellite of the second ink on the print medium, and a first dot pattern printed on the print medium based on the first quantized data has higher dispersibility than a second dot pattern printed on the print medium based on the second quantized data.

According to a third aspect of the present invention, there is provided a storage medium adapted to store a program for instructing a computer to function as respective units of an image processing apparatus for printing an image on a print medium by using a printing unit that ejects a first ink based on first quantized data and ejects a second ink based on second quantized data, the image processing apparatus comprising: a first quantization unit which quantizes multi-valued data corresponding to the first ink to generate the first quantized data, the multi-valued data indicating intermediate density; and a second quantization unit which quantizes multi-valued data corresponding to the second ink to generate the second quantized data, the multi-valued data indicating intermediate density, wherein: a satellite of the first ink is more conspicuous than a satellite of the second ink on the print medium, and a first dot pattern printed on the print medium based on the first quantized data has higher dispersibility than a second dot pattern printed on the print medium based on the second quantized data.

Further features of the present invention will become apparent from the following description of exemplary embodiments with reference to the attached drawings.

BRIEF DESCRIPTION OF THE DRAWINGS

FIGS. 10A to 10C are diagrams for explaining a dither process;

DESCRIPTION OF THE EMBODIMENTS

First Embodiment

Figure 1:
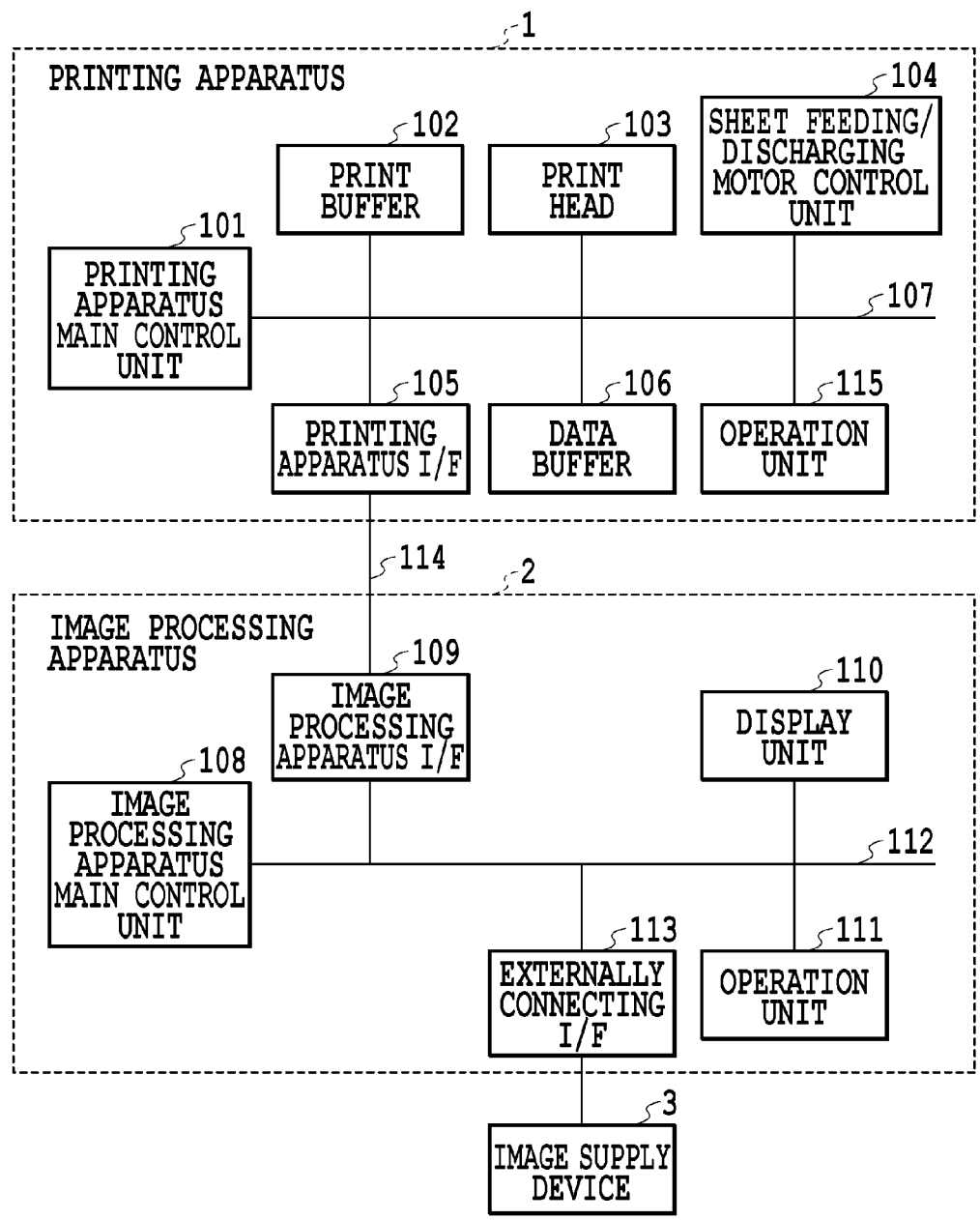
FIG. 1 is a block diagram illustrating the configuration of inkjet printing system control.

FIG. 1 is a block diagram illustrating the configuration of inkjet printing system control applicable to the present invention. The inkjet printing system in the present embodiment is configured to include an image supply device 3, an image processing apparatus 2, and an inkjet printing apparatus 1 (hereinafter also simply referred to as a printing apparatus). Image data supplied from the image supply device 3 is subjected to a predetermined image process in the image processing apparatus 2, then sent to the printing apparatus 1, and printed by a print head 103.

In the printing apparatus 1, a printing apparatus main control unit 101 is one for controlling the whole of the printing apparatus 1, and configured to include a CPU, ROM, RAM, and the like. A print buffer 102 can store image data before transfer to the print head 103 as raster data. The print head 103 is an inkjet type print head having multiple ejection ports capable of ejecting inks as droplets, and in accordance with image data stored in the print buffer 102, ejects inks from respective ejection ports. In the present embodiment, it is assumed that ejection port arrays for four colors of cyan, magenta, yellow, and black are arrayed on the print head 103.

A sheet feeding/discharging motor control unit 104 controls conveyance of print media and sheet feeding/discharging. A printing apparatus interface (I/F) 105 transceives a data signal with the image processing apparatus 2. An I/F signal line 114 connects the both. As the I/F signal line 114, one specified by, for example, Centronics Data Computer Corporation can be applied. A data buffer 106 temporarily stores image data received from the image processing apparatus 2. A system bus 107 connects the respective functions of the printing apparatus 1. An operation unit 115 includes an LCD adapted to display various pieces of information to a user, and buttons for the user to perform a command operation.

Figure 2:
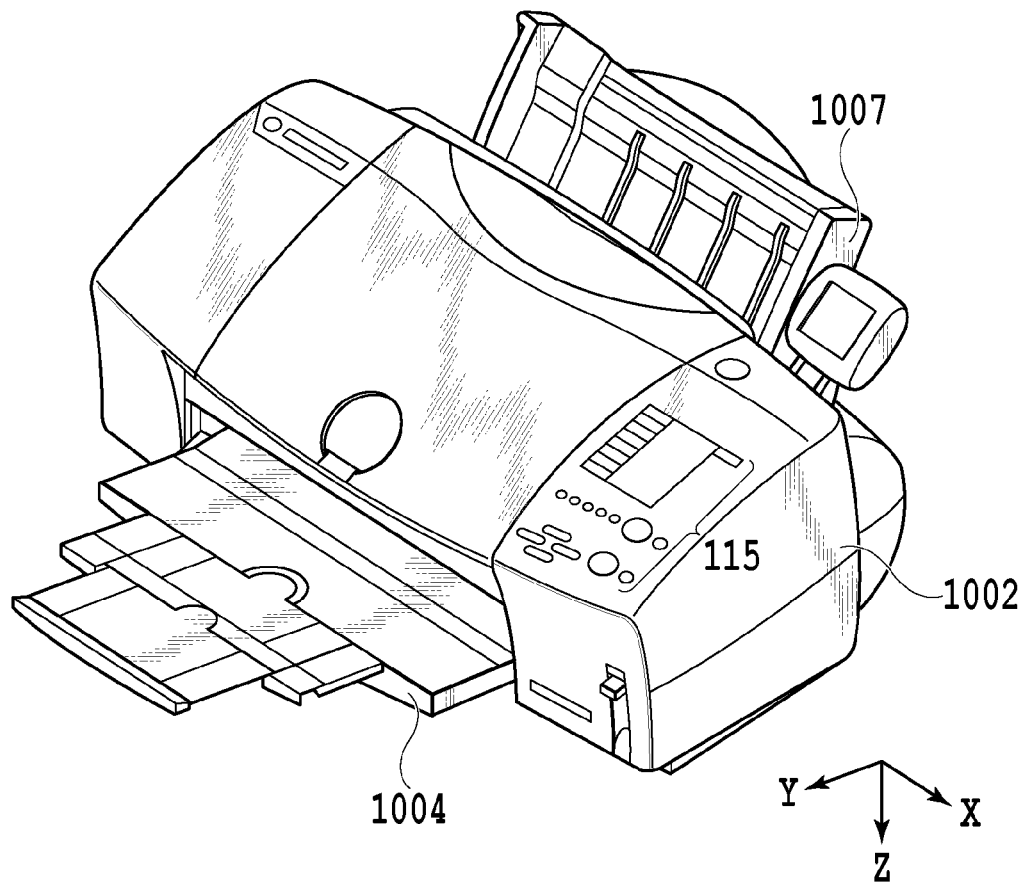
FIG. 2 is a schematic perspective view of a printing apparatus.

FIG. 2 illustrates a schematic perspective view of the printing apparatus 1. On an outer covering surface, the operation unit 115 described with FIG. 1 is disposed. A paper feed tray 1007 is capable of placing multiple print media, and when a print command is inputted, the uppermost one print medium is conveyed into an apparatus main body 1002. The conveyed print medium is printed with an image corresponding to one scan by the print head 103 disposed inside moving in an X direction while ejecting inks in a Z direction. After the one print scan has been finished, the print medium is conveyed in a Y direction a distance corresponding to a print width of the print head 103. By repeating the print scan by the print head 103 and the conveyance action of the print medium as described, an image is formed on the print medium in a stepwise manner. The print medium on which printing is completed is discharged onto a paper discharge tray 1004.

Figure 3:
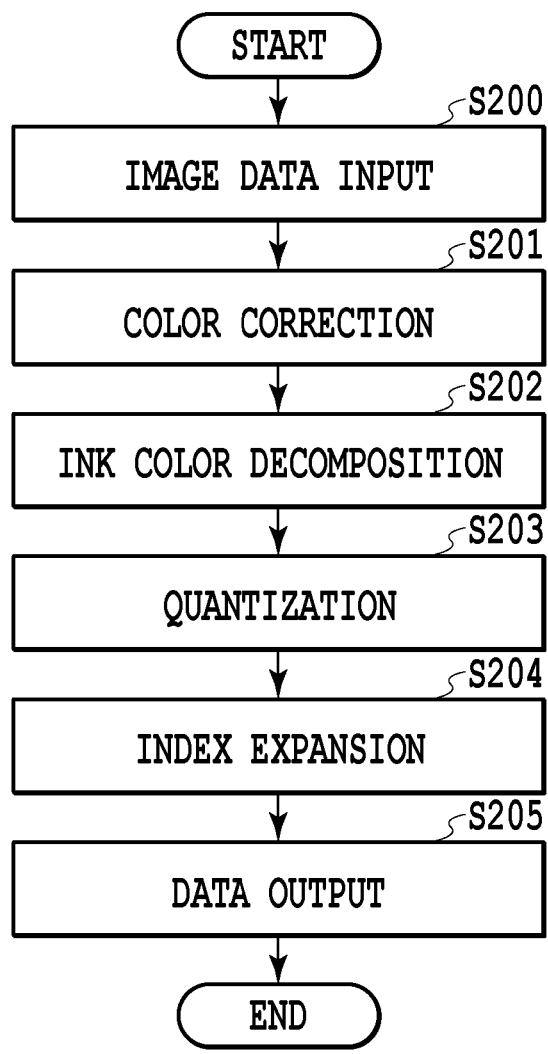
FIG. 3 is a flowchart for explaining an image data process.
Figure 6:
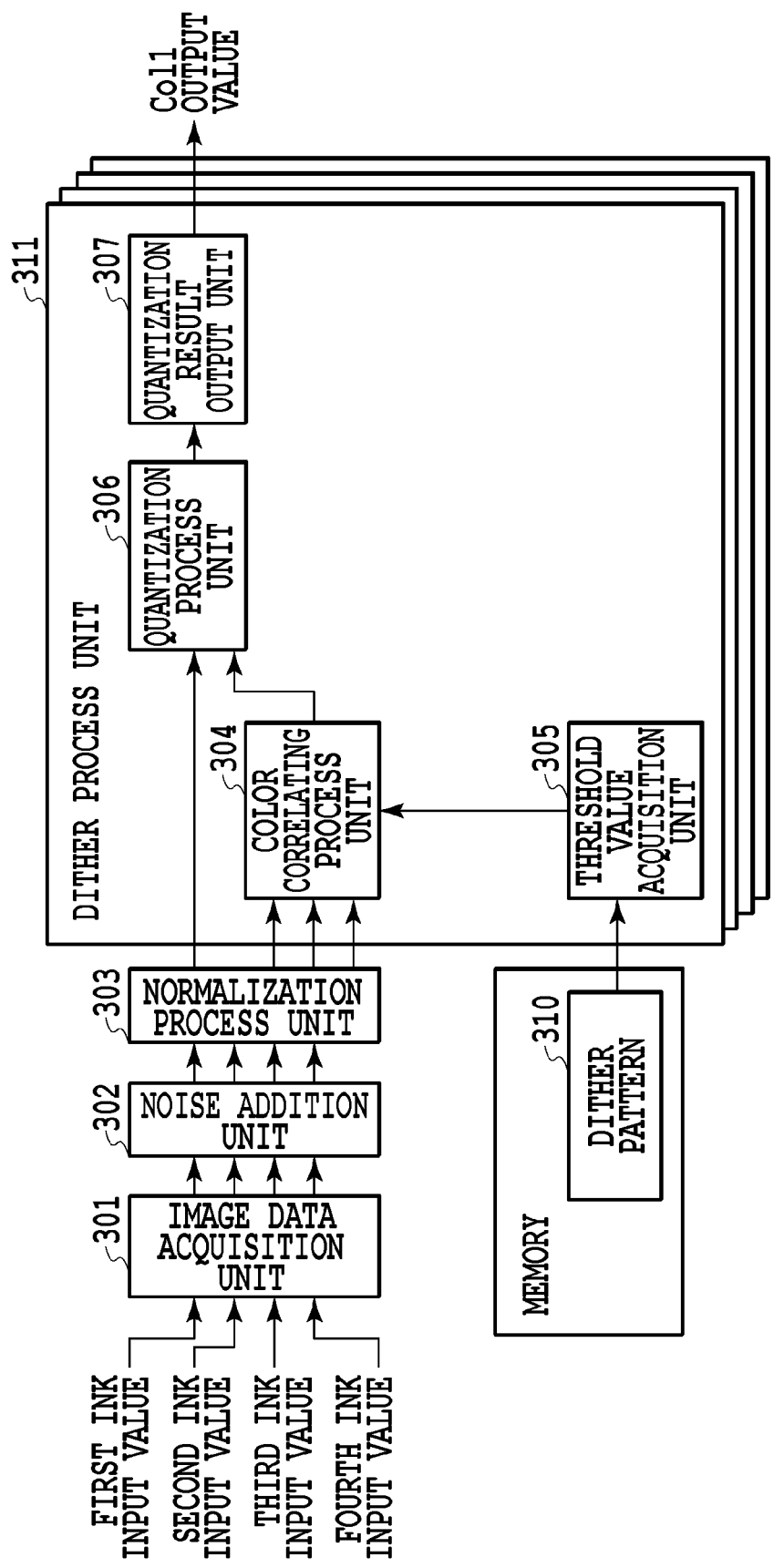
FIG. 6 is a block diagram for explaining the detail of a quantization process in a first embodiment.
Figure 7A:
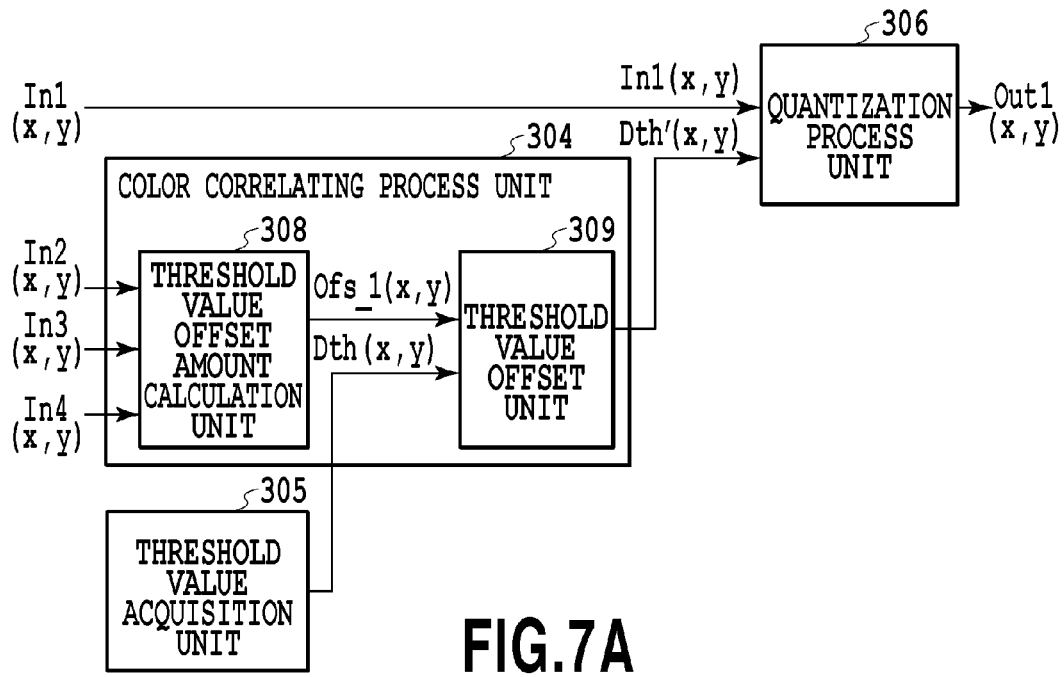
FIGS. 7A and 7B are diagrams for explaining a color correlating process unit.
Figure 7B:
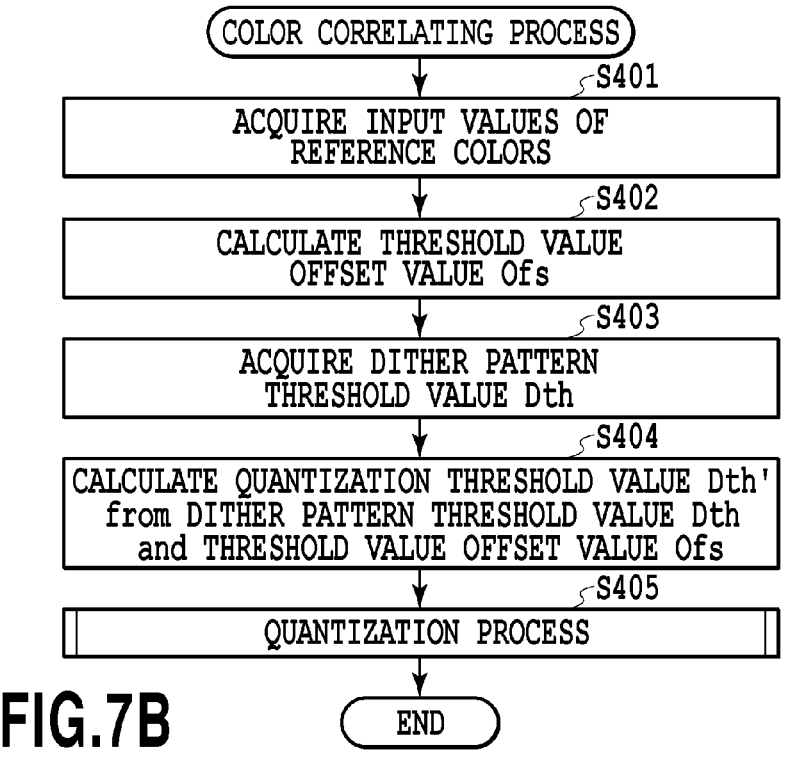

Returning to FIG. 1, in the image processing apparatus 2, an image processing apparatus main control unit 108 is one for performing various processes on an image supplied from the image supply device 3, and thereby generating image data printable by the printing apparatus 1, and includes a CPU, ROM, RAM, and the like. The below-described configuration illustrated in FIGS. 6 and 7A is also provided in the image processing apparatus main control unit 108, and flowcharts to be described with FIGS. 3 and 7B are performed by the CPU of the image processing apparatus main control unit 108. An image processing apparatus interface (I/F) 109 transceives a data signal with the printing apparatus 1. An externally connecting interface (I/F) 113 transceives image data with the image supply device 3 externally connected. A display unit 110 displays various pieces of information to a user, and can be applied with a display such as an LCD. An operation unit 111 is a mechanism for a user to perform a command operation, and can be applied with, for example, a keyboard and a mouse. A system bus 112 connects the image processing apparatus main control unit 108 and the respective functions to each other.

FIG. 3 is a flowchart for explaining an image data process performed by the image processing apparatus main control unit 108 in the present embodiment. This process is performed by the CPU provided in the image processing apparatus main control unit 108 in accordance with a program stored in the ROM. In FIG. 3, when image data on a target pixel is inputted from the image supply device 3 (Step S200), the image processing apparatus main control unit 108 first makes a color correction in Step S201. The image data received by the image processing apparatus 2 from the image supply device 3 includes pieces of R (red), G (green), and B (blue) 8-bit luminance data for expressing standardized color space such as sRGB. In Step S201, these pieces of luminance data are converted to pieces of RGB 12-bit luminance data corresponding to color space specific to the printing apparatus. As a method for converting a signal value, a publicly known method such as a method that refers to a lookup table (LUT) preliminarily stored in the ROM or the like can be employed.

In Step S202, the image processing apparatus main control unit 108 decomposes the converted pieces of RGB data to pieces of 16-bit gradation data (density data) respectively for C (cyan), M (magenta), Y (yellow), and K (black) that are the ink colors of the printing apparatus. In this step, a 16-bit gray image is generated for each of four channels (four colors). In the ink color decomposition process as well, a lookup table (LUT) preliminarily stored in the ROM or the like can be referred to as in the color correction process.

In Step S203, the image processing apparatus main control unit 108 performs a predetermined quantization process on the pieces of 16-bit gradation data respectively corresponding to the ink colors to convert to pieces of several bit quantized data. For example, in the case of quantization into 3-level data, the pieces of 16-bit gradation data are converted to pieces of 2-bit data each corresponding to any of Level 0 to Level 2. The quantization process will be described later in detail.

In subsequent Step S204, the image processing apparatus main control unit 108 performs an index expansion process. Specifically, from among multiple dot arrangement patterns where the number of dots to be printed in each pixel and a corresponding position are determined, one dot arrangement pattern is related to a level obtained in Step S203 to be selected. Then, resultant pieces of dot data are outputted as pieces of binary data (Step S205). This completes the image data process.

Figure 4:
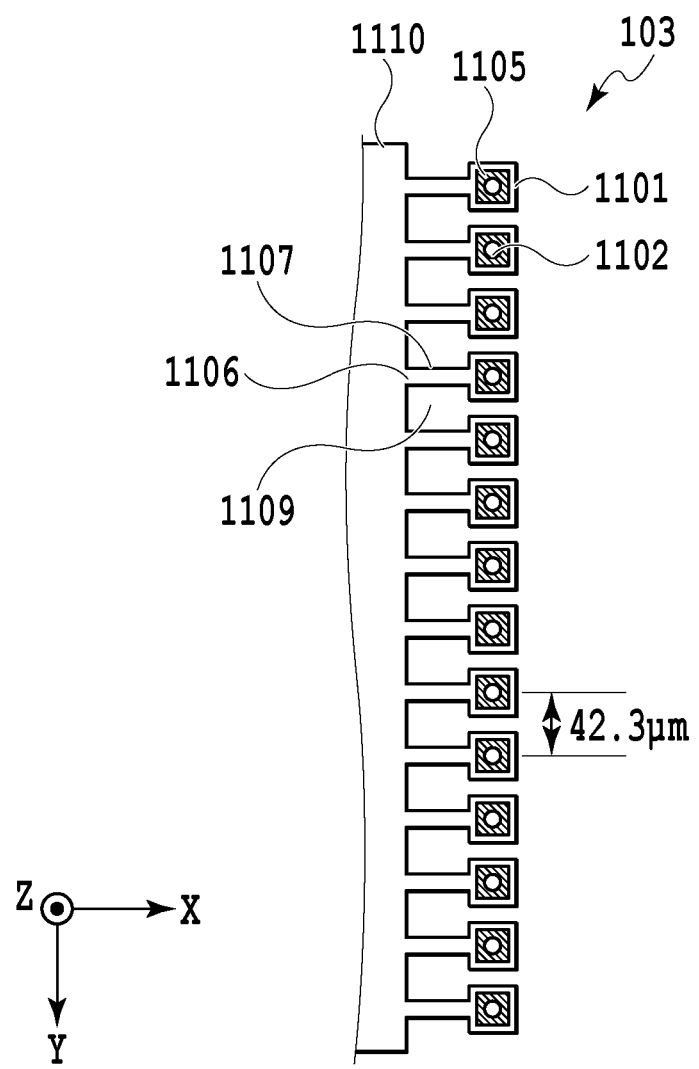
FIG. 4 is a transparent view of a print head as seen from an ejection port side.

FIG. 4 is a transparent view of the print head 103 in the present embodiment as seen from an ejection port side. Ink filled in a common liquid chamber 1110 passes through flow paths 1107 from corresponding liquid supply ports 1106, and is guided to corresponding pressure chambers 1101. Between the respective flow paths 1107, a wall 1109 is formed. In each of the pressure chambers 1101, an electrothermal transducer 1105 is disposed, and in a position facing to the electrothermal transducer 1105, an ejection port 1102 is formed. It is configured that when voltage is applied to the electrothermal transducer 1105 in accordance with a print signal, film boiling occurs in the ink inside a corresponding pressure chamber 1101, and growth energy of generated foam ejects the ink from the ejection port 1102 as a droplet. In the present embodiment, the multiple ejection ports 1102 are arrayed in the Y direction at a density of 600 dpi, i.e., at intervals of 42.3 μm.

Immediately after the ejection action, the ink inside the pressure chamber 1101 disappears; however, the ink is newly supplied from the common liquid chamber 1110 by a capillary action of a corresponding flow path 1107 to form a meniscus near the ejection port 1102. Such a meniscus has a preferable state (position or shape) for performing normal ejection, and desirably returns to the normal state by the next ejection. For this reason, in printing apparatuses, a driving frequency of a print head is set in consideration of a formation time of such a meniscus.

Figure 5A:
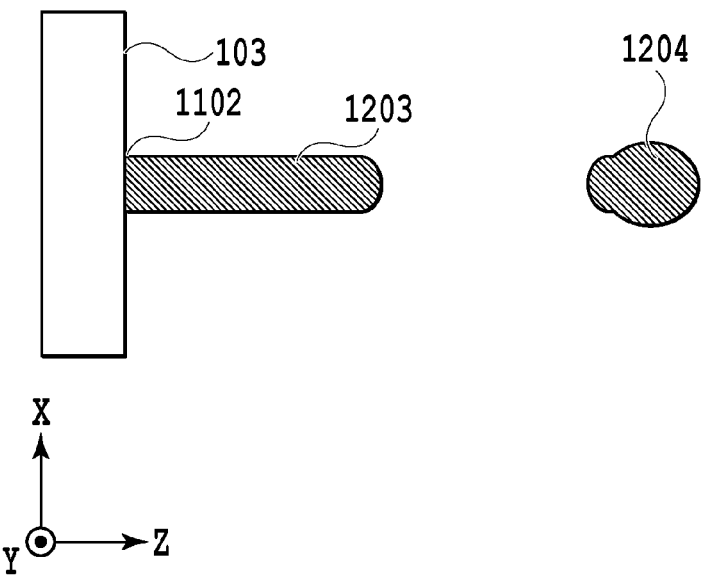
FIGS. 5A and 5B are diagrams for explaining ink ejection states.
Figure 5B:
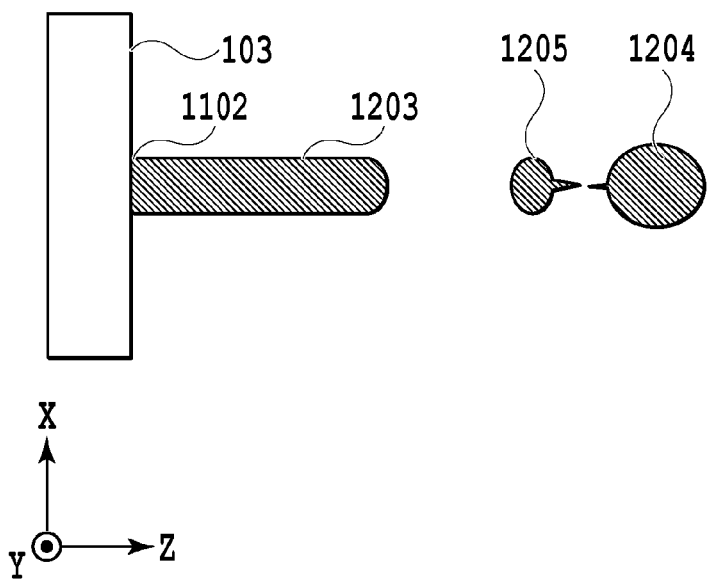

FIGS. 5A and 5B are diagrams for explaining ink ejection states from an ejection port 1102 when the drive voltage is applied to a corresponding electrothermal transducer 1105. FIGS. 5A and 5B respectively illustrate the case where no satellite occurs and the case where a satellite occurs. Ink pressed out from the ejection port 1102 as a result of the growth of generated foam extends in the Z direction while forming an ink column 1203. In so doing, in the middle of the ink column 1203, a narrow part that narrows along with the extension of the ink is formed, and when the ink extends to some extent, the ink column is cut. When the ink column is cut, a part positioned on the far side of the cut part in the +Z direction becomes a droplet to be ejected, and forms a dot on a print medium.

In the case where such a cutting action occurs only at one site of the narrow part, only a main droplet is produced as in FIG. 5A, preventing the occurrence of a satellite. However, in cases such as the case where the viscosity of ink is low, the cutting affects a large area, and consequently as illustrated in FIG. 5B, a sub-droplet is produced in addition to a main droplet, producing a satellite. FIG. 5B illustrates the case where only one sub-droplet is produced; however, many more smaller sub-droplets sometimes occur. In particular, it has been confirmed that as the viscosity of ink becomes lower, more sub-droplets or satellites tend to occur. That is, in the case of using multiple ink types in one printing apparatus, a satellite occurrence state is different depending on an ink type.

On the other hand, the presence/absence or state of such satellite occurrence also depends on a meniscus state as described above. Referring to FIG. 4 again, in the print head in which a number of ejection ports are disposed at high density as in the present embodiment, a meniscus formed in each pressure chamber 1101 is affected by not only an ejection action in that pressure chamber but ejection actions in peripheral pressure chambers. This is because since the ink filled in the one common liquid chamber is equally supplied to multiple flow paths 1107 disposed at a short distance, the fluid pressure of the ink supplied to one flow path 1107 propagates to peripheral flow paths and ejection ports. In addition, such displacement of a meniscus destabilizes the length and speed of an ink column at the time of ejection, and as a result, significantly affects the occurrence of a satellite as well. A phenomenon where fluid pressure associated with an ejection action of one ejection port affects ejection actions of peripheral ejection ports is referred to as crosstalk.

In order to keep the effect of crosstalk to the minimum necessary to stabilize a meniscus, it is effective to minimize continuous ejection actions of each ejection port, and simultaneous or continuous ejection actions among peripheral ejection ports. In other words, by dispersing the positions of ejection ports made to perform ejection actions or the timings of the ejection actions at intervals or time intervals enough to prevent fluid pressure from reaching, crosstalk can be suppressed to stabilize a meniscus, suppressing a satellite. In the present embodiment, as means adapted to disperse the positions of ejection ports made to perform ejection actions or the timings of the ejection actions as much as possible, a quantization process is utilized.

In a printing apparatus adapted to express image density on the basis of printing or non-printing of dot as in the inkjet printing apparatus in the present embodiment, it is necessary to quantize multi-valued density data to low level data usable by the printing apparatus. Conventionally, as such a quantization method, an error diffusion method and a dither method have been known. In particular, in the case of outputting a colored photograph image, dot dispersibility in a lower gradation range is focused on, and therefore a quantization process different for each ink color is performed to print dots of different colors at mutually different positions. In so doing, in a dot pattern printed on a print medium, the distinctive features of an employed quantization process appear to some extent. That is, in the case of performing quantization processes respectively for different ink colors, the distinctive features of a dot pattern are different among the colors.

The present inventors have reached the following knowledge in consideration of the situations as described above. That is, among multiple quantization processes employable by a printing apparatus, a quantization process resulting in a dot pattern having relatively high dispersibility is set for an ink relatively easily causing the occurrence of a satellite. On the other hand, a quantization process resulting in a dot pattern having relatively low dispersibility is set for an ink relatively unlikely to cause the occurrence of a satellite.

In the following, a quantization process employed in the present embodiment, i.e., a quantization process performed in Step S203 of FIG. 3 will be described in detail.

FIG. 6 is a block diagram for explaining the detail of the quantization process in the present embodiment. The quantization process in the present invention is performed in accordance with the dither method. In the quantization process in the present embodiment, an input value is first processed, then a threshold value is processed, and finally the quantization process is performed. These series of processes are parallel performed on a color basis (on a channel basis). In the following, each of the processes will be described in detail with reference to FIG. 6.

An image data acquisition unit 301 acquires pieces of 16-bit gradation data indicating the density of each pixel. It is assumed that the image data acquisition unit 301 in the present embodiment can receive signals having at most 16 bits for eight colors. The diagram illustrates a state where the pieces of 16-bit data respectively on first to fourth inks are inputted.

A noise addition process unit 302 adds predetermined noise to the pieces of 16-bit gradation data. By adding the noise, even in the case where pieces of gradation data of the same level are continuously inputted, a state where the same patterns are continuously arranged can be avoided to reduce a stripe, texture, and the like. The noise addition process unit 302 multiplies a predetermined random table, fixed intensity, and variable intensity corresponding to an input value, and thereby noise is generated for each pixel and added to the input value. Note that the random table is a table adapted to set the polarity of noise, and sets a plus, zero, or a minus for each pixel position. The random table in the present embodiment can have at most eight faces, and the size of each table can be arbitrarily set. The fixed intensity indicates the intensity of a noise amount, and the magnitude of the intensity determines whether noise is large or small. In the present embodiment, by setting a random table or fixed intensity optimum for each print mode depending on the graininess of, the degrees of stripe and texture of an image, and the like, a noise amount can be appropriately adjusted.

A normalization process unit 303 relates a gradation value of each pixel represented by 16 bits to a level value enabling the index expansion in Step S204, and then normalizes each level range to 12 bits. In the following, a specific description will be given. In the case where the index expansion process in Step S204 is a process corresponding to n values from Level 0 to Level (n−1), the normalization process unit 303 equally divides 65535 gradations represented by 16 bits into (n−1). Further, a range corresponding to each level is normalized to 12 bits (4096 gradations). This makes it possible to, for each pixel, obtain pieces of 12-bit data related to any of Level 0 to Level (n−1).

For example, in the case where the index expansion process corresponds to three values of Level 0, Level 1, and Level 2, the normalization process unit 303 equally divides the 65535 gradations represented by 16 bits into two. Then, the normalization process unit 303 normalizes respective ranges corresponding to gradation values of 0 to 32767 and gradation values of 32768 to 65535 to 12 bits (0 to 4095 gradations). For a pixel within the input gradation values of 0 to 32767 as the first range, Level 0 or Level 1 is outputted by the subsequent quantization process, whereas for a pixel within the input gradation values of 32768 to 65535 as the second range, Level 1 or Level 2 is outputted by the subsequent quantization process. By the above-described control, even in the case where a quantization number (n) is any number, the subsequent quantization process can be performed in the same manner.

The processes in the image data acquisition unit 301 to the normalization process unit 303 described above are parallel performed on the pieces of gradation data on the respective colors. That is, in the present embodiment, the pieces of 12-bit data on black, cyan, magenta, and yellow are generated, and inputted to a dither process unit 311.

In the dither process unit 311, 12-bit data to be quantized (processing target data) is directly transmitted to a quantization process unit 306. On the other hand, pieces of 12-bit data on colors other than the processing target data are inputted to a color correlating process unit 304 as pieces of reference data. The color correlating process unit 304 performs a predetermined process on a threshold value acquired by a threshold value acquisition unit 305 on the basis of the pieces of reference data to determine a final threshold value, and transmits the final threshold value to the quantization process unit 306. The quantization process unit 306 compares the processing target data with the threshold value inputted from the color correlating process unit 304, and thereby determines printing (1) or non-printing (0) of dot.

The threshold value acquisition unit 305 acquires a threshold value corresponding to a pixel position associated with the processing target data from a dither pattern 310 stored in a memory such as the ROM. In the present embodiment, the dither pattern 310 is a threshold value matrix formed by arraying threshold values of 0 to 4095 so as to have blue noise characteristics, and can provide various sizes and shapes such as 512×512 pixels, 256×256 pixels, and 512×256 pixels. That is, the memory preliminarily stores multiple threshold value matrices having different sizes and shapes as described, and the threshold value acquisition unit 305 selects a threshold value matrix corresponding to a print mode from among the multiple threshold value matrices. Then, from among multiple threshold values arrayed in the selected threshold value matrix, the threshold value acquisition unit 305 provides a threshold value corresponding to the pixel position (x, y) associated with the processing target data to the color correlating process unit. In the following, a method for determining a threshold value in the color correlating process unit 304 will be described in detail. The distinctive features of a threshold value matrix having blue noise characteristics will be described later in detail.

FIGS. 7A and 7B are a block diagram and a flowchart, respectively, for explaining the configuration and steps of a process in the color correlating process unit 304. The color correlating process unit 304 sets the pieces of 12-bit data corresponding to the colors other than the processing target data as the pieces of reference data, uses these pieces of reference data to perform the predetermined process on the threshold value acquired by the threshold value acquisition unit 305, and calculates the threshold value for quantizing the processing target data. For example, in the case where the processing target data is 12-bit data on black, the pieces of reference data are pieces of 12-bit data on cyan, magenta, and yellow. In FIGS. 6, 7A, and 7B, the processing target data is denoted by In1(x, y), and the pieces of reference data are denoted by In2(x, y), In3(x, y), and In4(x, y). Here, (x, y) represents the pixel position, which serves as a coordinate parameter for the threshold value acquisition unit 305 to select the threshold value corresponding to the pixel position associated with the processing target data from the threshold value matrix.

Referring to FIG. 7A, the pieces of reference data In2(x, y) to In4(x, y) inputted to the color correlating process unit 304 are first inputted to a threshold value offset amount calculation unit 308 (Step S401). In doing so, the threshold value offset amount calculation unit 308 uses these pieces of reference data to calculate a threshold value offset $Ofs\_1(x, y)$ for the processing target data $In1(x, y)$ (Step S402). In the present embodiment, the threshold value offset value $Ofs\_1(x, y)$ is calculated in accordance with Expression 2.

$$Ofs\_1(x,y)=\Sigma i[\text{In}i(x,y)] \quad (2)$$

Here, i represents a parameter individually indicating, among the pieces of reference data In2(x, y) to In4(x, y), one or more pieces of reference data (hereinafter referred to as pieces of actual reference data) used to obtain the threshold value for the processing target data In1. The number and type of such pieces of actual reference data are predesignated for each processing target data.

In the present embodiment, it is assumed that in the case where the processing target data is In1(x, y), a null is the actual reference data, and in the case where the processing target data is In2(x, y), In1(x, y) is the actual reference data. It is also assumed that in the case where the processing target data is In3(x, y), In1(x, y) and In2(x, y) are the pieces of actual reference data, and in the case where the processing target data is In4(x, y), In1(x, y), In2(x, y), and In3(x, y) are the pieces of actual reference data. Accordingly, offsets $Ofs\_1(x, y)$ to $Ofs\_4(x, y)$ for the respective pieces of processing target data In1(x, y) to In4(x, y) can be expressed as follows in accordance with Expression 2.

$$\text{Ofs\_1}(x, y) = \Sigma i[In(x, y)] \quad (2\text{-}1)$$
$$= 0$$

$$\text{Ofs\_2}(x, y) = \Sigma i[In(x, y)] \quad (2\text{-}2)$$
$$= In1(x, y)$$

$$\text{Ofs\_3}(x, y) = \Sigma i[In(x, y)] \quad (2\text{-}3)$$
$$= In1(x, y) + In2(x, y)$$

$$\text{Ofs\_4}(x, y) = \Sigma i[In(x, y)] \quad (2\text{-}4)$$
$$= In1(x, y) + In2(x, y) + In3(x, y)$$

As described, when the threshold value offset values Ofs_1(x, y) to Ofs_4(x, y) are calculated, these values are inputted to a threshold value offset unit 309. On the other hand, the threshold value offset unit 309 acquires a threshold value Dth corresponding to the coordinates (x, y) of processing target data In (x, y) from the threshold value acquisition part 305 (Step S403).

In Step S404, the threshold value offset unit 309 subtracts the threshold value offset value Ofs_1(x, y) inputted from the threshold value offset amount calculation unit 308 from the threshold value Dth(x, y) inputted from the threshold value acquisition unit 305 to obtain a quantization threshold value Dth'(x, y).

$$Dth'(x,y)=Dth(x,y)-\text{Ofs\_1}(x,y) \quad (3)$$

In so doing, in the case where Dth'(x, y) takes a minus value, Dth_max (the maximum value among threshold values in the dither pattern) is added, and a resultant value is treated as the quantization threshold value Dth'(x, y). In doing so, the quantization threshold value Dth' is constantly Dth'=0 to Dth_max.

That is, in the case where Dth'(x, y)<0, the following expression holds:

$$Dth'(x,y)=Dth'(x,y)+Dth\_max \quad (4)$$

When the quantization threshold value Dth'(x, y) is obtained in accordance with Expression 3 or 4, the quantization process unit 306 compares the processing target data In1(x, y) and the quantization threshold value Dth'(x, y) with each other to determine printing (1) or non-printing (0) of dot for the pixel position (x, y). This completes the processing steps.

After that, as described with the flowchart in FIG. 3, quantized data Out1(x, y) represented by several bits is subjected to the index expansion process, and a dot pattern to be printed at the pixel position (x, y) is determined. In so doing, the number of dots to be printed at the pixel position (x, y) is set to be a number corresponding to a level value, such as one dot when the level value is 1, or two dots when the level value is 2.

Figure 8:
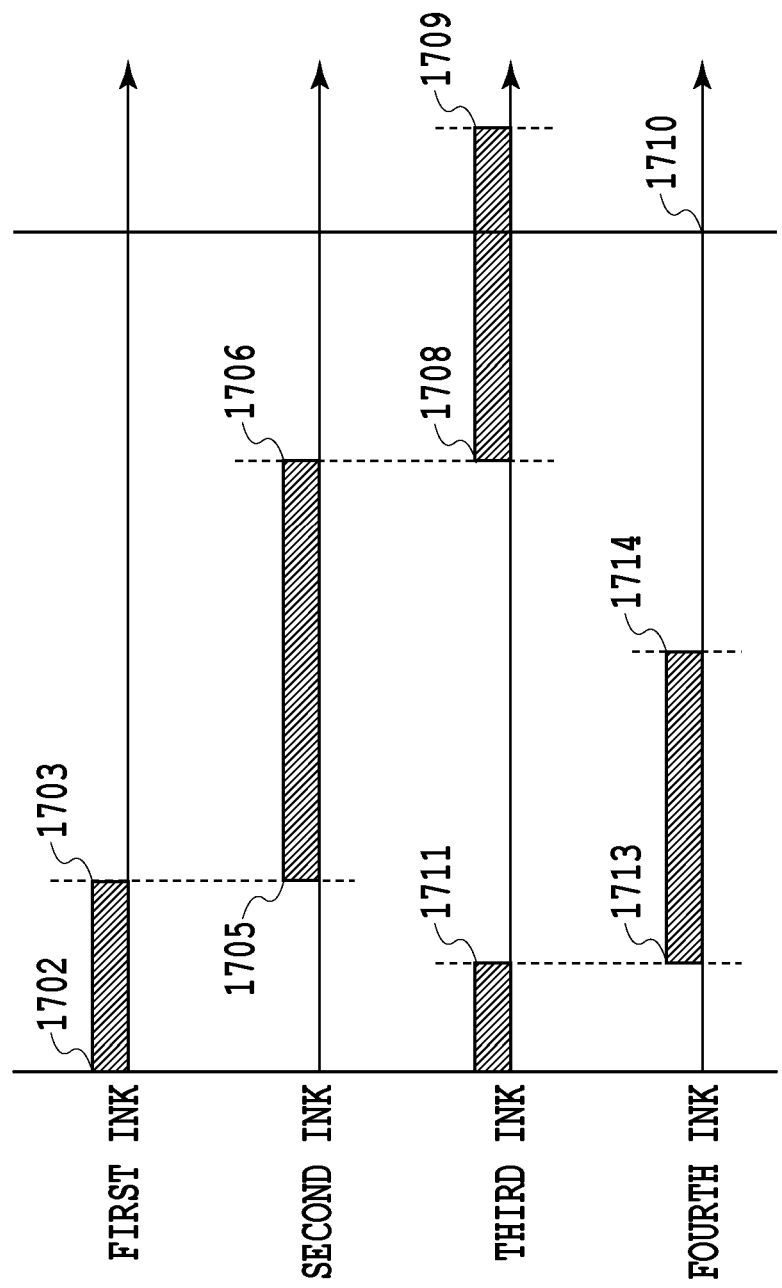
FIG. 8 is a diagram illustrating ranges of threshold values determined as printing on an ink color basis.

FIG. 8 is a diagram illustrating ranges of threshold values determined as printing (1) among the multiple threshold values 0 to Dth_max arranged in the dither pattern 310 when the first to fourth pieces of multi-valued data (In1 to In4) indicating intermediate density are inputted for the first to fourth inks, respectively. The horizontal axis represents a threshold value 0 to 4094, and "1710" represents Dth_max (the maximum value among the threshold values in the dither pattern). Each thick line indicates a threshold value range where dots are arranged. In the present embodiment, the offset of the first ink is Ofs_1=0 from Expression 2-1. Accordingly, pixel positions corresponding to any of threshold values of 0 to In1(1702 to 1703) among 0 to Dth_max are set to printing (1).

The offset of the second ink is Ofs_2=In1 from Expression 2-2. Accordingly, as a result of quantization using the threshold value Dth' obtained in accordance with Expressions 3 and 4, threshold values of In1 to In1+In2 (1705 to 1706) among the threshold values 0 to Dth_max arrayed in the dither pattern 310 are set to printing (1).

The offset of the third ink is Ofs_3=In1+In2 from Expression 2-3. Accordingly, as a result of quantization using the threshold value Dth' obtained in accordance with Expressions 3 and 4, In1+In2 to In1+In2+In3 (1708 to 1709) among the threshold values 0 to Dth_max arrayed in the dither pattern 310 are set to printing (1). Note that in this example, (In1+In2+In3) is assumed to exceed Dth_max. In this case, an area exceeding Dth_max is treated as follows. That is, an area corresponding to the remainder obtained by dividing (In1+In2+In3) by Dth_max, i.e., threshold values of 0 to In1+In2+In3−Dth_max are set to printing (1). In other words, In1+In2 to Dth_max (1708 to 1710) and 0 to In1+In2+In3−Dth_max (1707 to 1711) are threshold value ranges determined as printing (1).

The offset of the fourth ink is Ofs_4=In1+In2+In3 from Expression 2-4. Accordingly, as a result of quantization using the threshold value Dth' obtained in accordance with Expressions 3 and 4, In1+In2+In3 to In1+In2+In3+In4 among the threshold values 0 to Dth_max arrayed in the dither pattern 310 are threshold values set to printing (1). Note that in this example, the entire area of In1+In2+In3 to In1+In2+In3+In4 exceeds Dth_max. Therefore, an area corresponding to the remainder obtained by dividing (In1+In2+In3+In4) by Dth_max, i.e., threshold values of In1+In2+In3−Dth_max to In1+In2+In3+In4−Dth_max (1713 to 1714) are set to printing (1).

As described, in the present embodiment, despite using the common threshold value Dth, the quantization threshold values Dth' specific to the respective colors are obtained by setting the mutual input values as the offset values. Further, by using the newly obtained quantization threshold values Dth' for the quantization process, dots can be arranged such that a dot print pattern in which the multiple colors are mixed has blue noise characteristics even in the case where pieces of comparable gradation data indicating intermediate density are inputted for the respective colors.

Next, the distinctive features of a threshold value matrix used by the present embodiment will be described. The threshold value matrix used in the present embodiment is assumed to have blue noise characteristics. First, the blue noise characteristics will now be described.

Figure 9A:
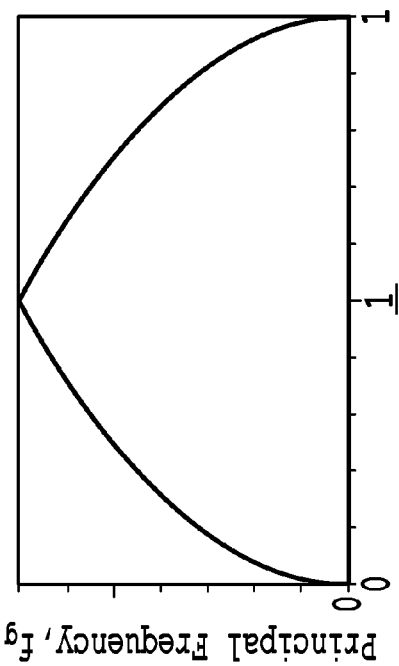
FIGS. 9A to 9D are diagrams illustrating blue noise characteristics and human visual characteristics.
Figure 9C:
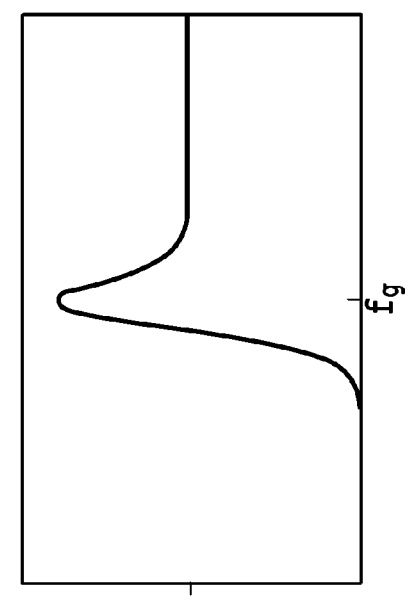
Figure 9D:
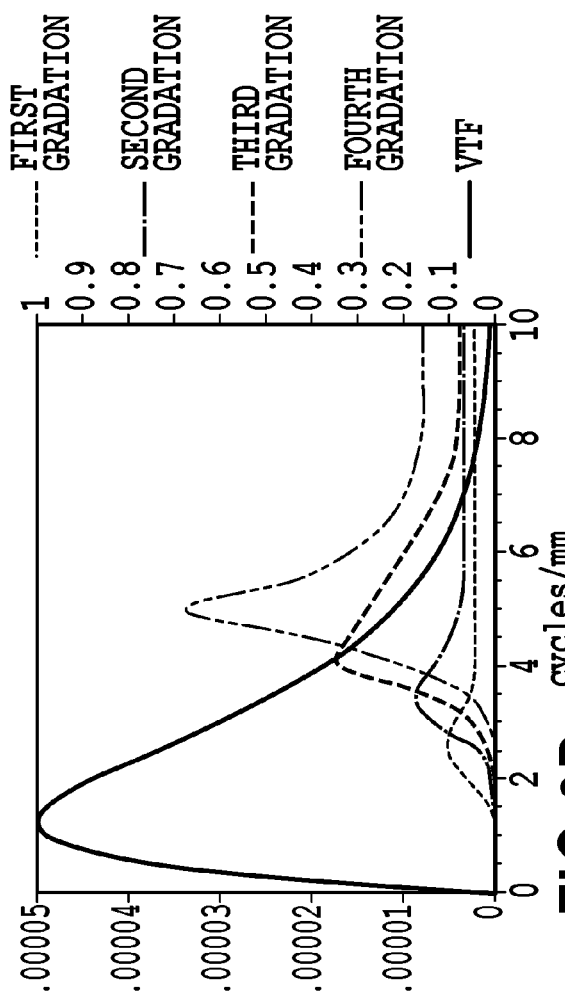
Figure 9B:
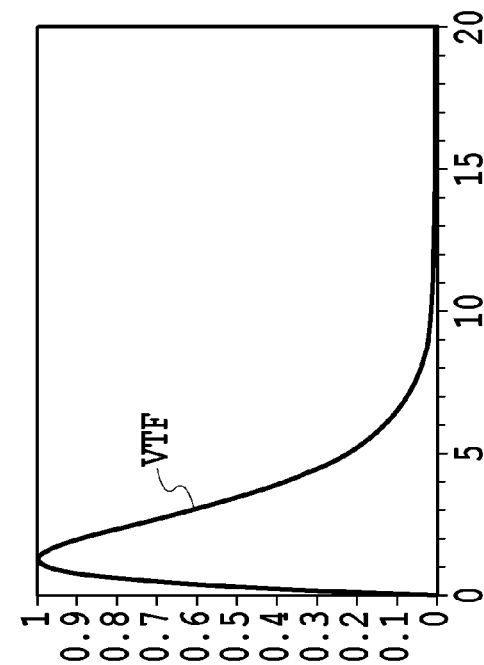

FIGS. 9A to 9D are diagrams illustrating blue noise characteristics and human visual characteristics or a human visual transfer function (VTF) at a visibility distance of 250 mm. In FIGS. 9A and 9B, the horizontal axis represents a frequency (cycles/mm), indicating lower and higher frequencies toward the left and right of the graph, respectively. On the other hand, the vertical axis represents intensity (power) corresponding to each frequency.

Referring to FIG. 9A, the blue noise characteristics are characterized by, for example, a suppressed low frequency component, a rapid rise, and a flat high frequency component. Hereinafter, a frequency fg corresponding to a peak resulting from the rapid rise is referred to as a principal frequency. On the other hand, as illustrated in FIG. 9B, the human visual characteristics exhibit high sensitivity in a lower frequency range, but sensitivity in a higher frequency range is low. That is, the lower frequency component is conspicuous, whereas the higher frequency component is inconspicuous. The blue noise characteristics are based on such visual characteristics, and adapted to, in the visual characteristics, hardly have power in the highly sensitive (conspicuous) lower frequency range, but have power in the low sensitive (inconspicuous) higher frequency range. For this reason, when a person visually observes an image having blue noise characteristics, dot deviation or periodicity is unlikely to be perceived, and the image is recognized as a comfortable image.

Meanwhile, in the blue noise characteristics described with FIG. 9A, the principal frequency fg is an average frequency when dispersing a predetermined number of dots as uniformly as possible; however, the principal frequency fg depends on a degree of dot concentration, i.e., gradation.

In FIG. 9C, the horizontal axis represents a gray level g (i.e., the degree of dot concentration), and the vertical axis represents the principal frequency fg at each gray level. The gray level g is given on the assumption that a state where dots are placed in all pixels in an image area corresponds to "1", a state where no dots are placed in all the pixels to "0", and a state where dots are placed in half of the pixels to "½". The principal frequency fg in this case can be expressed by Expression 1.

$$fg = \sqrt{g}|u| \, g \leq \tfrac{1}{2} \quad (1)$$

$$\sqrt{(1-g)}|u| \, g > \tfrac{1}{2}$$

In Expression 1, u represents the reciprocal of a pixel spacing. As can be seen from FIG. 9C and Expression 1, the principal frequency fg takes the maximum value of $fg = \sqrt{(½)}|u|$ at a gray level of g=½, i.e., when dots are arranged in 50% of the pixels in the entire pixel area. In addition, as the gray level g separates from ½, the principal frequency fg also gradually shifts toward the lower frequency side.

FIG. 9D is a diagram illustrating frequency characteristics in four types of gradation lower than a gray level g of ½ when performing a quantization process using a threshold value matrix having blue noise characteristics, together with the visual characteristics VTF. The diagram illustrates the case where the first gradation has the lowest gray level, and the gray level increases from the second to the third, to the fourth. Blue noise characteristics indicating that a lower frequency component is suppressed and then there is a peak at a principal frequency fg are common to all the types of gradation. That is, in any type of gradation, dot deviation or periodicity is unlikely to be perceived, and an image is recognized as a comfortable image.

FIGS. 10A to 10C are diagrams for explaining a dither process using a threshold value matrix adapted to achieve blue noise characteristics. FIG. 10A illustrates the threshold value matrix that corresponds to a 512-pixel×512-pixel area used in the present embodiment and is adapted to achieve the blue noise characteristics. Each pixel is related to any of threshold values of 0 to 4095. In the dither method, in the case where the gradation value In1 (~In4) indicated by the multi-valued image data is larger than the threshold value Dth', a corresponding pixel is designated as dot printing "1". On the other hand, in the case where the gradation value indicated by the multi-valued image data is equal to or less than the threshold value, the pixel is designated as non-printing "0" of dot. FIG. 10B illustrates a quantization result based on the dither method when pieces of image data having the same value are inputted into all the pixels. Pixels representing printing "1" of dot are indicated in black, and pixels representing non-printing "0" of dot are indicated in white. Dot deviation or periodicity is unlikely to be perceived, and a dot pattern is recognized as a smooth image. FIG. 10C is a diagram illustrating the frequency distribution of the dot pattern illustrated in FIG. 10B. The dot pattern has the distinctive features of the blue noise characteristics illustrated in FIG. 9A, such as a suppressed lower frequency component, a rapid rise, and a flat higher frequency component.

As described above, in the present embodiment, with using the threshold value matrix having the blue noise characteristics as described with FIGS. 10A to 10C, the quantization process is performed on the respective colors with an offset different for each of the colors being applied as illustrated in FIG. 8. For this reason, in particular, in a lower gradation area, dots of different colors are never printed overlapping each other, and the mixed color image having high dispersibility can be obtained.

Meanwhile, when comparing the results of printing the first to fourth inks in FIG. 8 with one another, the difference in dispersibility can be recognized among these inks. In the following, such a difference in dispersibility will be described in detail.

Figure 11A:
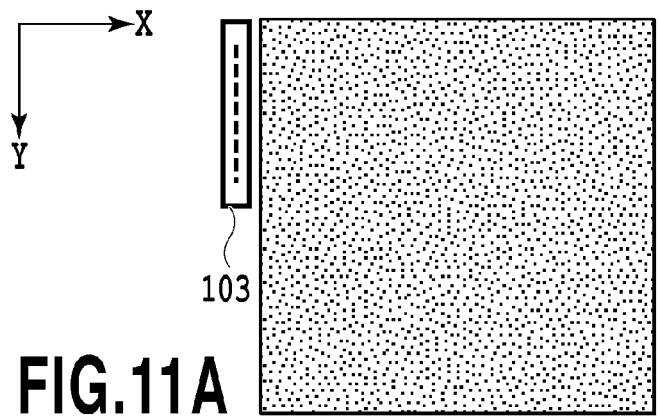
FIGS. 11A to 11C are diagrams respectively illustrating dot patterns and frequency characteristics of them.
Figure 11B:
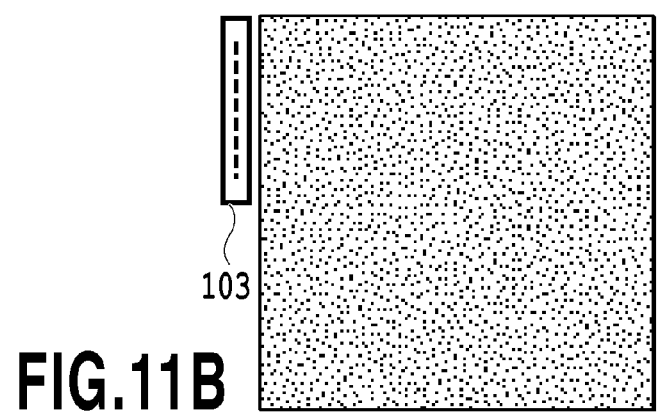
Figure 11C:
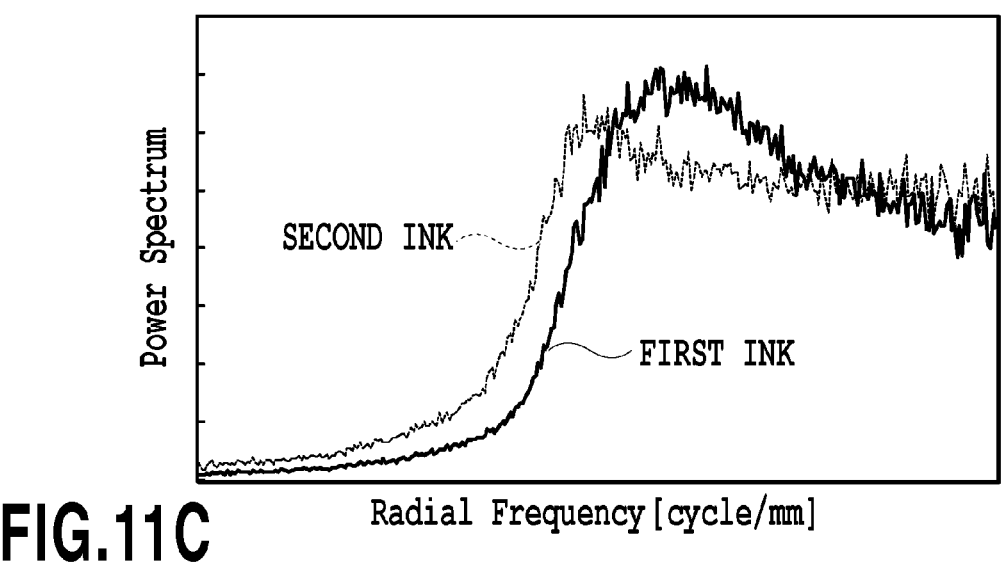

FIGS. 11A to 11C are diagrams respectively illustrating dot patterns and the frequency characteristics of the dot patterns when multi-valued data (34/255) is inputted for each of the first and second inks. When the multi-valued data (34/255) is inputted for the first ink, pixel positions where threshold values in the range of 0 to 33 in a threshold value matrix having arrayed threshold values of 0 to 254 are arranged are determined as printing (1). As a result, the dot pattern as illustrated in FIG. 11A is formed on a print medium in such a manner that the print head on which the multiple ejection ports are arrayed in the Y direction ejects the ink in accordance with the print data while moving in the X direction.

On the other hand, when the multi-valued data (34/255) is inputted for the second ink, threshold values are offset by an amount corresponding to the multi-value data (34/255) with respect to the first ink in accordance with Expression 2-2. That is, in the case of the second ink, pixel positions where threshold values in the range of 34 to 66 among the threshold values of 0 to 254 are arranged are determined as printing (1). As a result, the dot pattern as illustrated in FIG. 11B is formed on the print medium.

Here, when comparing the dot pattern illustrated in FIG. 11A with that illustrated in FIG. 11B, it turns out that the former does not have any site where two dots are adjacently printed, whereas the latter has sites where two dots are adjacently printed. That is, the graininess of the dot pattern illustrated in FIG. 11A is perceived to be lower than that of the dot pattern illustrated in FIG. 11B.

FIG. 11C is a diagram comparing the frequency characteristics of these two dot patterns. Any of the dot patterns has blue noise characteristics characterized by a suppressed lower frequency component, a rapid rise, and a flat higher frequency component; however, the first ink more strongly exhibits the above distinctive features than the second ink.

Figure 12A:
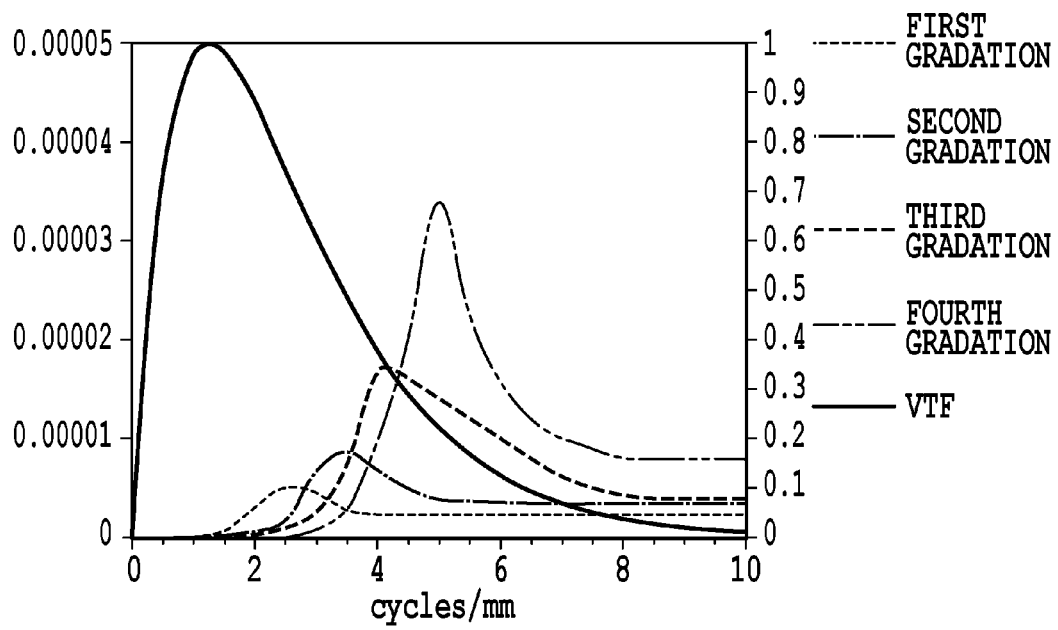
FIGS. 12A and 12B are diagrams illustrating the frequency characteristics of first and second inks.
Figure 12B:
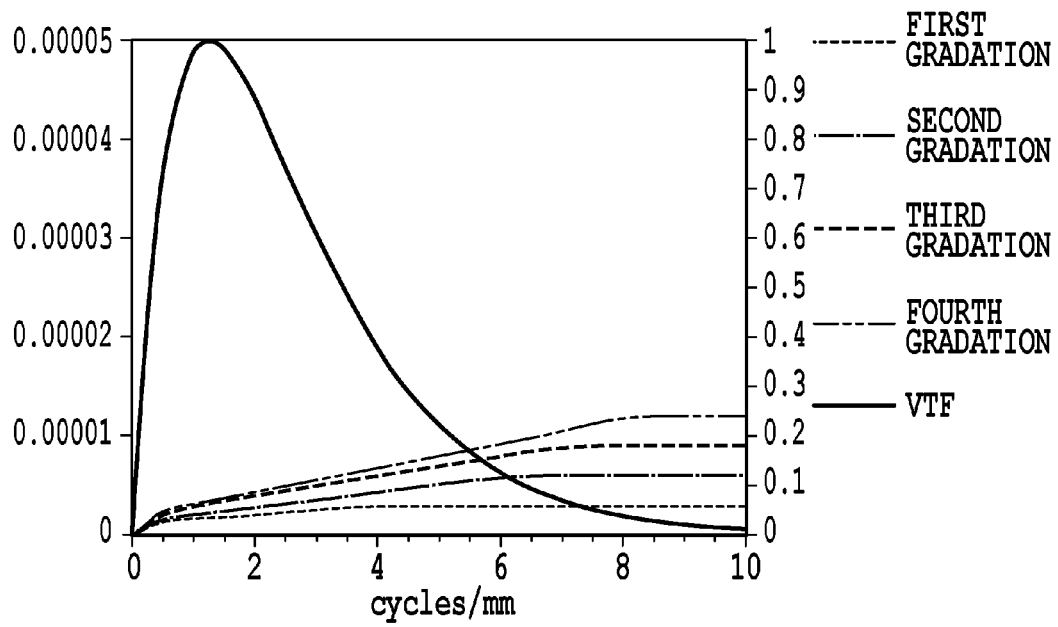

FIGS. 12A and 12B are diagrams illustrating the frequency characteristics of the first and second inks in four types of gradation having lower gray levels as with FIG. 9D. FIG. 12A illustrates the frequency characteristics of the first ink, and FIG. 12B illustrates the frequency characteristics of the second ink. In the case of the first ink having blue noise characteristics, in any type of gradation, the power of a lower frequency component is suppressed to be nearly zero, and at a principal frequency fg, a peak appears. That is, preferable dispersibility can be obtained regardless of the type of gradation.

On the other hand, in the case of the second ink having suppressed blue noise characteristics, in any type of gradation, the power gradually monotonously increases from the lower frequency range toward the higher frequency range, and no peak appears. From the above, it turns out that the first ink of which dots are arranged sequentially from a pixel having a threshold value of 0 has typical blue noise characteristics and can obtain high dispersibility as compared with the second ink of which dots are arranged sequentially from a moderately high threshold value.

In the present embodiment, the four types of inks of cyan, magenta, yellow, and black each composed of a color material, water-soluble solvent, penetrant, and the like are used; however, physical property values of these inks are different depending on the amounts or allocation of compositions, or a preparation method. Also, dot contrast, i.e., conspicuousness at the time of printing on a print medium is also different particularly depending on the type or content of a color material. For this reason, in the present embodiment, among these four types of inks, an ink of which a satellite is relatively conspicuous is set as the first ink. Further, an ink of which a satellite is relatively inconspicuous is set as any of the second to fourth inks. More specifically, a satellite of an ink having relatively low viscosity or an ink having relatively low color material lightness tends to be relatively conspicuous, and therefore such an ink is set as the first ink. Further, a satellite of an ink having relatively high viscosity or an ink having relatively high color material lightness tends to be inconspicuous, and therefore such an ink is set as any of the second to fourth inks.

In doing so, in the case of the ink of which a satellite is conspicuous, the positions or the timings of ejection ports made to perform ejection actions can be dispersed as much as possible, and a meniscus near any of the ejection ports can be stabilized to suppress a satellite. As a result, regardless of an image, an image superior in dispersibility can be stably outputted without making a satellite of any ink conspicuous.

In addition, for example, in the case where the graininess or satellite of a black ink is particularly conspicuous, by performing the following ink color decomposition process, image quality can be further improved.

Figure 13:
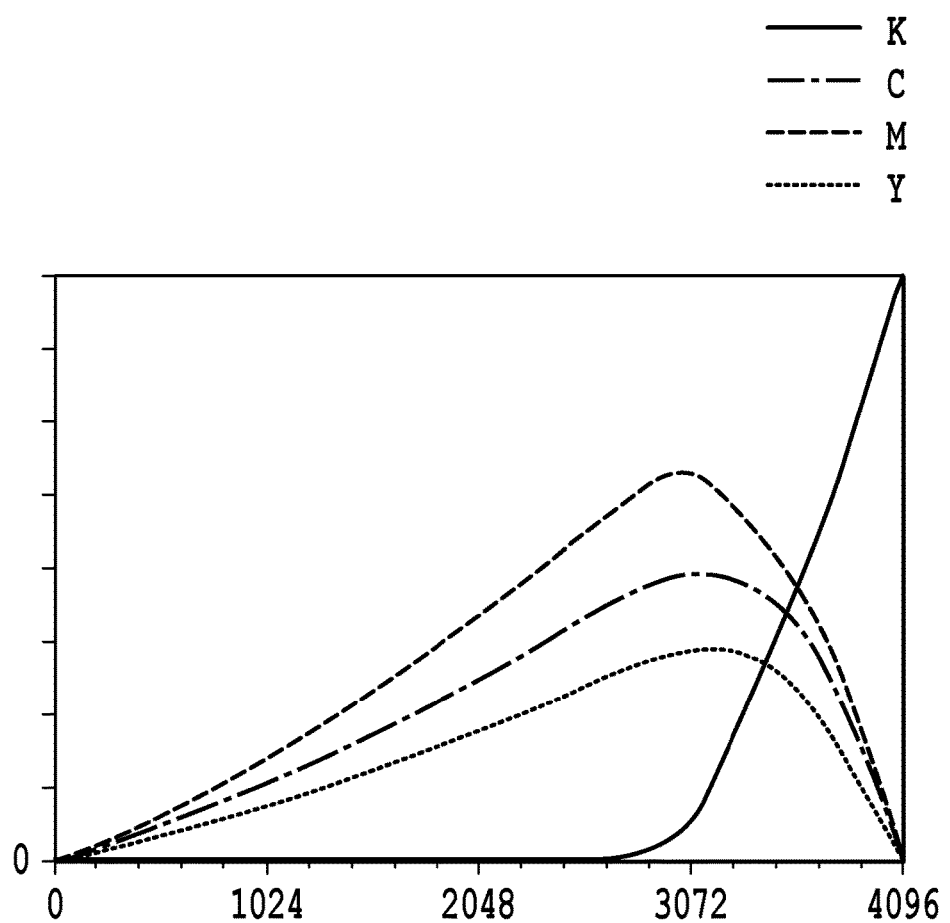
FIG. 13 is a diagram illustrating an example of an ink color decomposition process.

FIG. 13 is a diagram illustrating the distinctive features of the ink color decomposition process in the present embodiment performed in Step S202 of FIG. 3. In the ink color decomposition process, signal value conversion is performed such that various colors expressed by R (red), G (green), and B (blue) are expressed by four colors of cyan, magenta, yellow, and black. FIG. 13 illustrates a state where a gray line expressed by R (red), G (green), and B (blue) is converted to 16-bit cyan, magenta, yellow, and black. The horizontal axis represents a gray gradation level, and 0 corresponds to white, whereas 4096 corresponds to black. In the ink color decomposition process in the present embodiment, an output value of a black ink is suppressed to be zero from 0 to an intermediate density range. That is, in a gray color range having high lightness from white to intermediate density, gray is expressed by three colors of cyan, magenta, and yellow, and no black dot is printed. In addition, from a gradation level nearly exceeding the intermediate density, the black output value is gradually increased, whereas cyan, magenta, and yellow output values are decreased. At the highest density (4096), only black is printed, whereas the cyan, magenta, and yellow output values are set to be zero. Here, the gray line is taken as an example to give the description; however, ink color conversion that suppresses the black output value to be zero at least from the highlight to the intermediate density is performed on any hue. For this reason, a situation where black dots are sparsely printed in a blank area does not arise. In gradation where black dots are sparsely printed, relatively large amounts of the other inks are inevitably printed. That is, even in a state where black dots are sparsely printed, the contrast itself of black dots is inconspicuous, and even in the case where the graininess or satellite of a black dot is particularly conspicuous, it does not easily become problematic.

Also, even in the case of further using a gray ink in addition to the four colors of cyan, magenta, yellow, and black as described above, the above-described color decomposition process is effective.

Figure 14A:
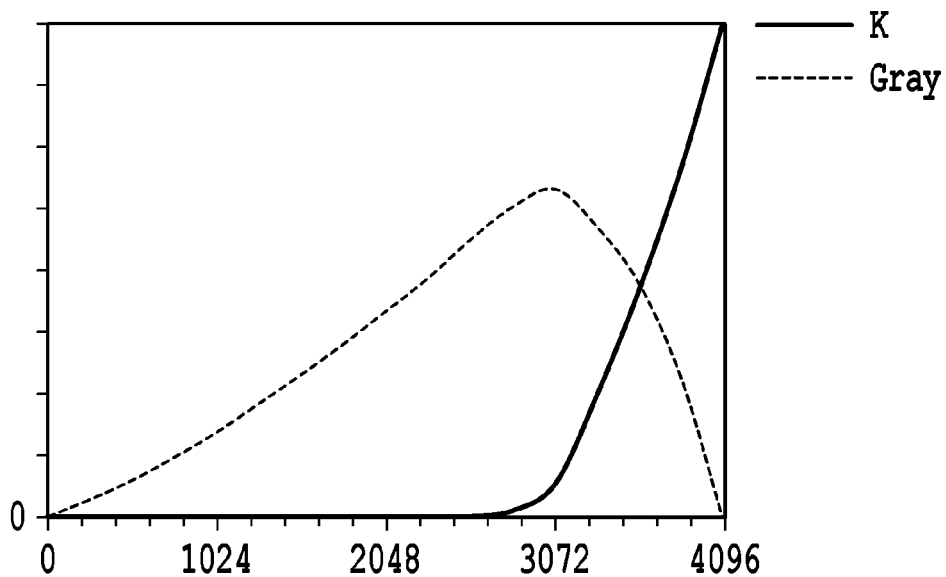
FIGS. 14A and 14B are diagrams illustrating other examples of the ink color decomposition process.
Figure 14B:
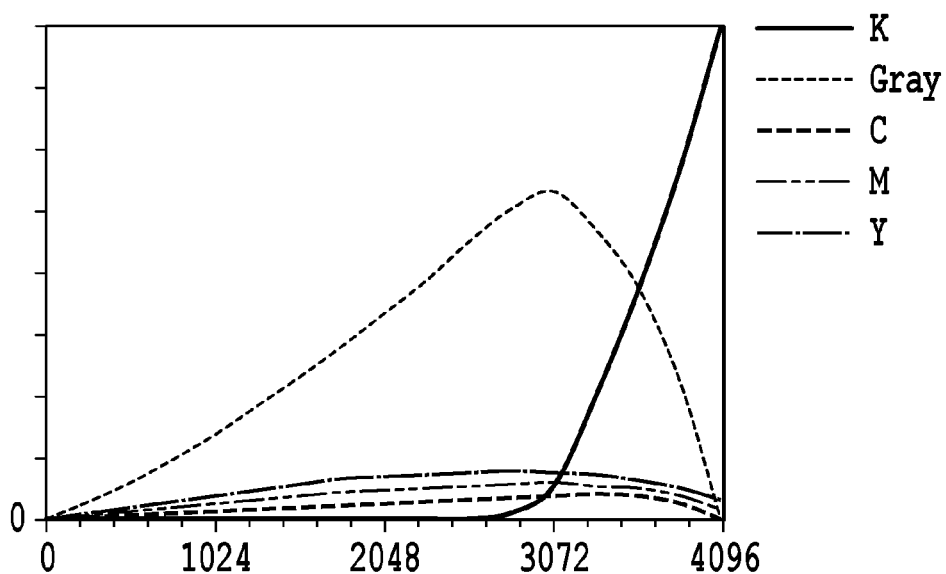

FIGS. 14A and 14B are diagrams for explaining the distinctive features of the ink color decomposition process performed in Step S202 of FIG. 3. In the diagrams, as in FIG. 12, a state where a gray line is converted into 16-bit gradation data on each ink color. FIG. 14A illustrates the case where the gray line is expressed only using a gray ink and a black ink. From 0 to an intermediate density range, only the gray ink is used, whereas an output value of the black ink is suppressed to be zero. Further, from a gradation level nearly exceeding the intermediate density, the black ink output value is gradually increased, whereas a gray output value is decreased, and at the highest density (4096), only black is outputted.

On the other hand, FIG. 14B illustrates the case where the gray line is expressed using, in addition to the gray ink and the black ink, cyan, magenta, and yellow inks. From 0 to an intermediate density range, the gray, cyan, magenta, and yellow inks are used, whereas a black ink output value is suppressed to be zero. Further, from a gradation level nearly exceeding the intermediate density, the black output value is gradually increased, whereas output values of the other colors are decreased, and at the highest density (4096), only black is outputted.

As described above, even in the case of performing the ink color decomposition process using the gray ink as in FIG. 14A or 14B, in gradation where black dots are sparsely printed, relatively large amounts of the other inks are inevitably printed. As a result, without making the graininess or satellite of a black dot conspicuous, a smooth image can be outputted.

Second Embodiment

The first embodiment uses the threshold value matrix having blue noise characteristics, which controls frequency components uniformly in all directions; however, the present embodiment uses a threshold value matrix that controls a frequency component in a specific direction. In the case of preparing a threshold value matrix while controlling frequency components, including blue noise characteristics, a void-and-cluster method can be employed. The detail of the void-and-cluster method is disclosed in Robert Ulichney, "The void-and-cluster method for dither array generation", Proceedings SPIE, Human Vision, Visual Processing, Digital Displays IV, vol. 1913, pp. 332-343, 1993.

In the void-and-cluster method, a dot pattern in arbitrary gradation is first determined for a pixel area corresponding to a threshold value matrix. Then, a degree of dot concentration at each pixel position is calculated. As a parameter for the degree of dot concentration, an intensity sum of filter output, which increases as the degree of dot concentration increases, and decreases as the degree of dot concentration decreases, is used. Subsequently, for the next gradation that is one level larger than the arbitrary gradation, a position where calculated degree of dot concentration is lowest is searched for, and a threshold value for the next gradation is set for the position. By repeating such a threshold value setting step until all threshold values are set, a desired threshold value matrix is generated.

In so doing, a weighting coefficient at the time of calculating the degree of dot concentration at each pixel position (x, y) can be made different between an X direction and a Y direction intersecting with the X direction. As has been described, factors destabilizing a meniscus in each ejection port include crosstalk associated with ejection actions of peripheral ejection ports, and a continuous ejection action of that ejection port itself. In so doing, in the case where the effect of the crosstalk is larger than the effect of the continuous ejection, it is only necessary to regard dispersibility in the ejection port arraying direction (Y direction) as more important than in the X direction, and increase a weighting coefficient in the Y direction. On the other hand, in the case where the effect of the continuous ejection is larger than the effect of the crosstalk, it is only necessary to make dispersibility in the continuous ejection direction (X direction) larger than in the Y direction. In so doing, as a distance between ejection ports increases, the effect of the crosstalk decreases or as an ejection time interval increases, the effect of the continuous ejection decreases, and therefore a weighting coefficient may be decreased depending on a distance from a target pixel. In either case, by employing the void-and-cluster method, a threshold value matrix making it possible to obtain suitable dispersibility appropriately for a satellite occurrence situation can be prepared.

In the present embodiment as well, by performing a quantization process while applying an offset to a threshold value for each of the colors as described with FIGS. 6 and 7 with using the above-described threshold value matrix, the same effect as that in the first embodiment can be obtained. That is, for an ink of which a satellite is likely to occur, the positions of ejection ports made to perform ejection actions, or the timings of the ejection actions can be dispersed as much as possible, and a meniscus near any of the ejection ports can be stabilized to suppress a satellite. Further, regardless of an image, a satellite of any ink can be made inconspicuous, and an image superior in dispersibility can be stably outputted.

Other Embodiments

The above embodiments are described on the basis of the configuration where, in consideration of the fact that an ink having lower viscosity tends to more easily give rise to a satellite, the quantization process resulting in relatively high dispersibility is set for an ink having relatively low viscosity. However, the present invention is not limited to such a configuration. Factors giving rise to a satellite as described with FIG. 5 include not only the viscosity of ink, but various factors such as the size of an ejection port, and ejection speed, in addition to physical properties such as ink density. Also, even in the case where comparable satellites occur, a satellite of an ink having high lightness like yellow is inconspicuous as compared with an ink having low lightness like black. Even though what factor and what color ink give rise to a satellite, as long as the quantization process resulting in relatively high dispersibility is set for an ink of which a satellite is relatively conspicuous, the present invention is effective.

Also, the above embodiments are described on the basis of the configuration where one threshold value matrix common to respective colors is prepared, and the quantization process is performed on each of the colors while applying different offsets to threshold values in the matrix; however, the present invention is not limited to such a configuration. The threshold value matrix may be prepared independently for each ink color from the beginning. In this case, by setting a threshold matrix having the highest dispersibility among multiple threshold matrices for an ink of which a satellite most easily appears, the same effect as that in the above embodiments can be obtained. Further, the present invention is not limited to the configuration using the dither process. For example, the present invention can also be configured to prepare multiple error diffusion processes having diffusion coefficients different, and use a process resulting in the highest dispersibility among the multiple processes for an ink of which a satellite is most conspicuous. In any case, as long as it is configured that different quantization processes are performed respectively on multiple colored inks of which satellites are different in conspicuousness, the configuration can be applied to the present invention.

Further, in the above, the inkjet printing system basically using cyan, magenta, yellow, and black is described; however, obviously, the present invention is not limited to such a combination of colored inks. A configuration additionally including, in addition to a gray ink, a particular color ink such as red, green, or blue, or light cyan or light magenta ink of which color material density is lower than that of cyan or magenta is also possible.

Also, the above description is given on the basis of the configuration where 16-bit data is quantized into several levels by the quantization process, and then a dot pattern corresponding to a level is related by the index expansion process; however, a way to express a multi-valued level is not limited to the index expansion. In the case where dots having multiple sizes are printable, or in the case where inks having multiple different densities are ejectable, printing can also be performed with a dot size or ink density related to each level. Even in the case of expressing a quantized level value in any manner, a dot array state depends on a quantization result. That is, even in the case of expressing a quantized level value in any manner, by setting a quantization process resulting in relatively high dispersibility for an ink of which a satellite is relatively conspicuous, the effect of the present invention can be sufficiently obtained.

In addition, the quantization process performed in Step S203 is not necessarily required to be a multi-valued quantization process that converts to several-bit multi-valued data. That is, the quantization process in Step S203 may directly convert 16-bit gradation data to 1-bit binary data through a dither process. In this case, the index expansion process described in Step S204 is omitted, and binary data obtained in Step S203 is directly outputted to the printing apparatus 1. Obviously, a bit number of input/output data in any of the other steps of FIG. 2 is not limited to that in the above-described embodiments. In order to keep accuracy, an output bit number may be made larger than an input bit number, and a bit number may be variously adjusted depending on application or situations.

Further, the above embodiments are described using the printing apparatus of a serial type illustrated in FIG. 2; however, the present invention is also applicable to a full line type printing apparatus. Also, the above embodiments are described on the basis of the configuration where all the steps illustrated in FIG. 3 are performed in the image processing apparatus 2; however, as long as each of the above processes is performed in the inkjet printing system of the embodiments illustrated in FIG. 1, the steps may be performed in any device. For example, a configuration where the steps up to the quantization in Step S203 are performed by the image processing apparatus 2, and the index process in Step S204 is performed in the printing apparatus 1 is also possible. Also, it may be configured that the printing apparatus 1 includes the functions of the image processing apparatus 2 described above, and all the steps subsequent to Step S201 are performed in the printing apparatus 1. In this case, the printing apparatus 1 serves as the image processing apparatus of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254026, filed Dec. 16, 2014 which is hereby incorporated by reference wherein in its entirety.

What is claimed is:

1. An image processing apparatus for printing an image on a print medium by using a printing unit that ejects a first ink based on first quantized data and ejects a second ink based on second quantized data, the image processing apparatus comprising:
   a first quantization unit configured to quantize multi-valued data corresponding to the first ink to generate the first quantized data, the multi-valued data indicating intermediate density; and
   a second quantization unit configured to quantize multi-valued data corresponding to the second ink to generate the second quantized data, the multi-valued data indicating intermediate density,
   wherein:
   a satellite of the first ink is more conspicuous than a satellite of the second ink on the print medium, and
   a first dot pattern printed on the print medium based on the first quantized data has higher dispersibility than a second dot pattern printed on the print medium based on the second quantized data.

2. The image processing apparatus according to claim 1, wherein the first quantization unit and the second quantization unit generate the first quantized data indicating printing of dot or non-printing of dot and the second quantized data indicating printing of dot or non-printing of dot by comparing the multi-valued data corresponding to the first ink and the multi-valued data corresponding to the second ink with corresponding threshold values, respectively.

3. The image processing apparatus according to claim 2, wherein:
   the first quantization unit and the second quantization unit refer to a same threshold value matrix in which multiple threshold values are arrayed;
   the first quantization unit performs a quantization process by comparing the multi-valued data corresponding to the first ink with a threshold value stored in the threshold value matrix; and
   the second quantization unit performs the quantization process by comparing the multi-valued data corresponding to the second ink with a threshold value resulting from applying an offset to the threshold value compared by the first quantization unit.

4. The image processing apparatus according to claim 3, wherein the threshold value matrix has a blue noise characteristics.

5. The image processing apparatus according to claim 3, wherein the threshold value matrix is formed so as to keep low frequency power lower than high frequency power in the first dot pattern and the second dot pattern.

6. The image processing apparatus according to claim 2, wherein the first quantization unit and the second quantization unit refer to mutually different threshold value matrices each other in which multiple threshold values are arrayed, and perform the quantization process of the multi-valued data corresponding to the first ink and the quantization process of the multi-valued data corresponding to the second ink, respectively.

7. The image processing apparatus according to claim 4, wherein the threshold value matrices have blue noise characteristics, respectively.

8. The image processing apparatus according to claim 4, wherein the threshold value matrices are formed so as to keep low frequency power lower than high frequency power in the first dot pattern and the second dot pattern.

9. The image processing apparatus according to claim 1, wherein:
   the printing unit ejects the first ink and the second ink respectively based on the first quantized data and the second quantized data with use of ejection port arrays each in which multiple ejection ports adapted to eject ink are arrayed; and
   in the first dot pattern, dispersibility in a direction of the arraying is higher than dispersibility in a direction intersecting with the direction of the arraying.

10. The image processing apparatus according to claim 1, wherein:
   the printing unit ejects the first ink and the second ink respectively based on the first quantized data and the second quantized data with use of ejection port arrays each in which multiple ejection ports adapted to eject ink are arrayed; and
   in the first dot pattern, dispersibility in a direction intersecting with a direction of the arraying is higher than dispersibility in the direction of the arraying.

11. The image processing apparatus according to claim 1, wherein the first ink is lower in viscosity than the second ink.

12. The image processing apparatus according to claim 1, wherein the first ink is lower in lightness than the second ink.

13. The image processing apparatus according to claim 1, further comprising a unit configured to convert the first quantized data into the first dot pattern and convert the second quantized data into the second dot pattern with use of a dot arrangement pattern in which dot arrangement is predetermined in an area corresponding to a pixel.

14. The image processing apparatus according to claim 1, further comprising the printing unit configured to eject the first ink based on the first quantized data and eject the second ink based on the second quantized data to print on the print medium.

15. An image processing method for printing an image on a print medium by ejecting a first ink based on first quantized data and ejecting a second ink based on second quantized data, the image processing method comprising:
a first quantization step of quantizing multi-valued data corresponding to the first ink to generate the first quantized data, the multi-valued data indicating intermediate density; and
a second quantization step of quantizing multi-valued data corresponding to the second ink to generate the second quantized data, the multi-valued data indicating intermediate density,
wherein:
a satellite of the first ink is more conspicuous than a satellite of the second ink on the print medium, and
a first dot pattern printed on the print medium based on the first quantized data has higher dispersibility than a second dot pattern printed on the print medium based on the second quantized data.

16. An image processing apparatus for printing an image on a print medium by using a printing unit that ejects a first ink based on first quantized data and ejects a second ink based on second quantized data, the image processing apparatus comprising:
a first quantization unit configured to quantize multi-valued data corresponding to the first ink to generate the first quantized data; and
a second quantization unit configured to quantize multi-valued data corresponding to the second ink to generate the second quantized data,
wherein:
a satellite of the first ink is more conspicuous than a satellite of the second ink on the print medium,
the first quantization unit and the second quantization unit generate the first quantized data indicating printing of dot or non-printing of dot and the second quantized data indicating printing of dot or non-printing of dot by comparing the multi-valued data corresponding to the first ink and the multi-valued data corresponding to the second ink with corresponding threshold values, respectively,
the first quantization unit and the second quantization unit refer to the same threshold value matrix in which multiple threshold values are arrayed,
the first quantization unit performs a quantization process by comparing the multi-valued data corresponding to the first ink with a threshold value stored in said threshold value matrix, and
the second quantization unit changes a difference between the multi-valued data corresponding to the second ink and a threshold value stored in said threshold value matrix according to the multi-valued data corresponding to first ink and then performs the quantization process for the multi-valued data corresponding to the second ink.

17. The image processing apparatus according to claim 16, wherein the second quantization unit performs the quantization process by comparing the multi-valued data corresponding to the second ink with a threshold value resulting from applying an offset to the threshold value compared by the first quantization unit according to the multi-valued data corresponding to the first ink.

18. The image processing apparatus according to claim 17, wherein the second quantization unit performs the quantization process by comparing the multi-valued data corresponding to the second ink with a threshold value resulting from subtracting the multi-valued data corresponding to the first ink from the threshold value compared by the first quantization unit.

19. The image processing apparatus according to claim 16, wherein the threshold value matrix has a blue noise characteristic.

20. The image processing apparatus according to claim 16, wherein the threshold value matrix is formed so as to keep low frequency power lower than high frequency power in the first dot pattern and the second dot pattern.

21. The image processing apparatus according to claim 16, wherein the first ink is lower in viscosity than the second ink.

22. The image processing apparatus according to claim 16, wherein the first quantized data and the second quantized data are three or more levels data, and
the image processing apparatus further comprises a unit configured to convert the first quantized data into a first dot pattern data and convert the second quantized data into a second dot pattern data with use of a dot arrangement pattern in which dot arrangement is predetermined in an area corresponding to a pixel.

23. The image processing apparatus according to claim 22, wherein the first ink is lower in lightness than the second ink.

24. The image processing apparatus according to claim 16, further comprising the printing unit that ejects the first ink in accordance with the first quantized data and ejects the second ink in accordance with the second quantized data.

25. An image processing method for printing an image on a print medium by using a printing unit that ejects a first ink based on first quantized data and ejects a second ink based on second quantized data, the image processing method comprising:
a first quantization step of quantizing multi-valued data corresponding to the first ink to generate the first quantized data; and
a second quantization step of quantizing multi-valued data corresponding to the second ink to generate the second quantized data,
wherein:
a satellite of the first ink is more conspicuous than a satellite of the second ink on the print medium, and
the first quantization step and the second quantization step generate the first quantized data indicating printing of dot or non-printing of dot and the second quantized data indicating printing of dot or non-printing of dot by comparing the multi-valued data corresponding to the first ink and the multi-valued data corresponding to the second ink with corresponding threshold values, respectively, the first quantization step and the second quantization step refer to the same threshold value matrix in which multiple threshold values are arrayed, the first quantization step performs a quantization process by comparing the multi-valued data corresponding to the first ink with a threshold value stored in said threshold value matrix, and the second quantization step changes a difference between the multi-valued data corresponding to the second ink and a threshold value stored in said threshold value matrix according to the multi-valued data corresponding to first ink and then performs the quantization process for the multi-valued data corresponding to the second ink.

\* \* \* \* \*